United States Patent
Cheng et al.

(10) Patent No.: US 7,814,355 B2
(45) Date of Patent: *Oct. 12, 2010

(54) SYSTEM, ELECTRONIC DEVICE AND METHOD FOR TIMELY RECEIVING AND DISPLAYING ELECTRONIC FILES

(75) Inventors: Hua-Dong Cheng, Shenzhen (CN); Ta-Cheng Chiu, Shenzhen (CN); Kuan-Hong Hsieh, Shenzhen (CN)

(73) Assignees: Hon Fu Jin Precision Industry (Shen Zhen) Co., Ltd., Longhua Town, Bao'an District, Shenzhen, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 953 days.

This patent is subject to a terminal disclaimer.

(21) Appl. No.: 11/309,522

(22) Filed: Aug. 17, 2006

(65) Prior Publication Data
US 2007/0075830 A1   Apr. 5, 2007

(30) Foreign Application Priority Data
Sep. 5, 2005   (TW) ............................. 94130301 A

(51) Int. Cl.
G06F 1/26 (2006.01)
G06F 1/32 (2006.01)
(52) U.S. Cl. ..................... 713/324; 713/300; 713/310; 713/322; 713/323; 345/211
(58) Field of Classification Search ................. 713/300, 713/322, 310, 323, 324; 345/211
See application file for complete search history.

(56) References Cited

U.S. PATENT DOCUMENTS 5,692,197 A * 11/1997 Narad et al. ................. 713/323

(Continued)

FOREIGN PATENT DOCUMENTS

CN    1358014 A    7/2002

(Continued)

OTHER PUBLICATIONS

Information technology-Telecommunications and information exchange between systems-Local and metropolitan area networks-Specific requirements-Part11: Wireless LAN Medium Access Control (MAC) and Physical Layer (PHY) specifications, 1997 IEEE p. 1, 22, 34-37, 133-136.*

*Primary Examiner*—Vincent T Tran
(74) *Attorney, Agent, or Firm*—Winston Hsu

(57) ABSTRACT

A method for timely receiving and displaying electronic files is provided. The method includes: providing an electronic device being electrically coupled to an electronic sending device, the electronic device comprising a receiving unit and a main part, the main part being in one of a "power-on" state and a "power-off" state; receiving a want-to-send signal from the electronic sending device with the receiving unit; determining the main part is in the "power-on" state or in the "power-off" state via the power controlling unit; providing power supply to the main part under control of the receiving unit if the main part is in the "power-off" state; sending a ready-to-receive signal to inform the electronic sending device of sending an electronic file; receiving the electronic file from the electronic sending device with the receiving unit; displaying the electronic file with the main part.

9 Claims, 3 Drawing Sheets

U.S. PATENT DOCUMENTS

| | | | | |
|---|---|---|---|---|
| 5,742,833 | A * | 4/1998 | Dea et al. | 713/323 |
| 6,289,464 | B1 * | 9/2001 | Wecker et al. | 713/300 |
| 6,658,576 | B1 * | 12/2003 | Lee | 713/320 |
| 2003/0143983 | A1 * | 7/2003 | Crampton | 455/414 |
| 2004/0034803 | A1 * | 2/2004 | Hamilton | 713/300 |
| 2004/0053643 | A1 * | 3/2004 | Kimura | 455/558 |
| 2004/0225901 | A1 * | 11/2004 | Bear et al. | 713/300 |
| 2005/0047356 | A1 * | 3/2005 | Fujii et al. | 370/311 |
| 2005/0273637 | A1 * | 12/2005 | Lu | 713/322 |
| 2007/0132751 | A1 * | 6/2007 | Claessen | 345/211 |

FOREIGN PATENT DOCUMENTS

| | | |
|---|---|---|
| CN | 1178127 C | 12/2004 |
| TW | M242778 | 9/2004 |

* cited by examiner

SYSTEM, ELECTRONIC DEVICE AND METHOD FOR TIMELY RECEIVING AND DISPLAYING ELECTRONIC FILES

TECHNICAL FIELD

The present invention relates generally to a system, electronic device and method for timely receiving and displaying an electronic file to users.

GENERAL BACKGROUND

As computer becomes more and more important in people's daily life, people are getting accustomed to storing frequently used information in a computer digitally (i.e., electronic files). Traditionally, paper was the norm for information exchange and data transferring. Today, with network technologies, information exchange and data transferring via networks has replaced the traditional method. This new method allows important files to be transferred timely and correctly.

Currently, a good number of electronic devices can be used to transfer electronic files over a wireless network. However, a prerequisite for transferring electronic files between two electronic devices is that both of the electronic devices must be in a "power-on" state, namely, not only the electronic device sending the electronic files (hereinafter "the electronic sending device"), but also the electronic device that receiving the electronic files (hereinafter "the receiving electronic device") must be powered on. If the receiving electronic device is in a "power-off" state, namely, the receiving electronic device is powered off, the electronic files from the electronic sending device can not be displayed to a recipient until the receiving electronic device is powered on. Therefore, electronic files, especially important electronic files cannot reach the recipients in time.

What is still needed is a system, electronic device and method which can receive and display electronic files to the recipient even when the receiving electronic device is in the "power-off" state.

SUMMARY

A system for receiving and displaying electronic files is provided. A preferred embodiment of the system includes: an electronic sending device and an electronic device. The electronic sending device sends an electronic file and sends a want-to-send signal before the electronic file is sent. The want-to-send signal is predetermined for informing the electronic device of receiving the electronic file. The electronic device being electrically coupled to the electronic sending device and configured for receiving and displaying the electronic file, the electronic device comprising a power unit, a main part, a power controlling unit, and a receiving unit. The power unit is for supplying power. The main part is for displaying the electronic file being in one of a "power-on" state and a "power-off" state. The power controlling unit is interposed between the power unit and the main part, and configured for controlling the main part to be in the "power-on" state or in the "power-off" state. The receiving unit is for receiving the want-to-send signal and performs the following tasks upon receiving the want-to-send signal: determining the main part is in the "power-on" state or in the "power-off" state via the power controlling unit; sending a power controlling signal to the power controlling unit and commanding the power controlling unit to provide power to the main part if the main part is in the "power-off" state; sending a ready-to-receive signal to inform the electronic sending device to send the electronic file; receiving the electronic file from the electronic sending device; and transmitting the electronic file to the main part to display.

A method for receiving and displaying electronic files is provided. A preferred embodiment of the method includes: providing an electronic device being electrically coupled to an electronic sending device, the electronic device comprising a receiving unit and a main part, the main part being in one of a "power-on" state and a "power-off" state; receiving a want-to-send signal from the electronic sending device with the receiving unit, the want-to-send signal being predetermined for informing the electronic device of receiving the electronic file; determining the main part is in the "power-on" state or in the "power-off" state via the power controlling unit; providing power supply to the main part under control of the receiving unit if the main part is in the "power-off" state; sending a ready-to-receive signal to inform the electronic sending device of sending an electronic file; receiving the electronic file from the electronic sending device with the receiving unit; displaying the electronic file with the main part.

An electronic device for receiving and displaying electronic files is provided. The electronic device is electrically coupled to an electronic sending device, and the electronic sending device is for sending an electronic file and sending a want-to-send signal before the electronic file is sent. The want-to-send signal is for informing the electronic device to receive the electronic file. The electronic device includes a power unit, a receiving unit, a main part and a power controlling unit. The power unit is for supplying power. The main part is for displaying the electronic file being in one of a "power-on" state and a "power-off" state. The power controlling unit is interposed between the power unit and the main part, and configured for controlling the main part to be in the "power-on" state or in the "power-off" state. The receiving unit is for receiving the want-to-send signal and performs the following tasks upon receiving the want-to-send signal: determining the main part is in the "power-on" state or in the "power-off" state via the power controlling unit; sending a power controlling signal to the power controlling unit and commanding the power controlling unit to provide power to the main part if the main part is in the "power-off" state; sending a ready-to-receive signal to inform the electronic sending device to send the electronic file; receiving the electronic file from the electronic sending device; and transmitting the electronic file to the main part to display.

Other advantages and novel features will be drawn from the following detailed description of the preferred embodiment with reference to the attached drawings, in which:

DETAILED DESCRIPTION OF THE PREFERRED EMBODIMENT

Figure 1:
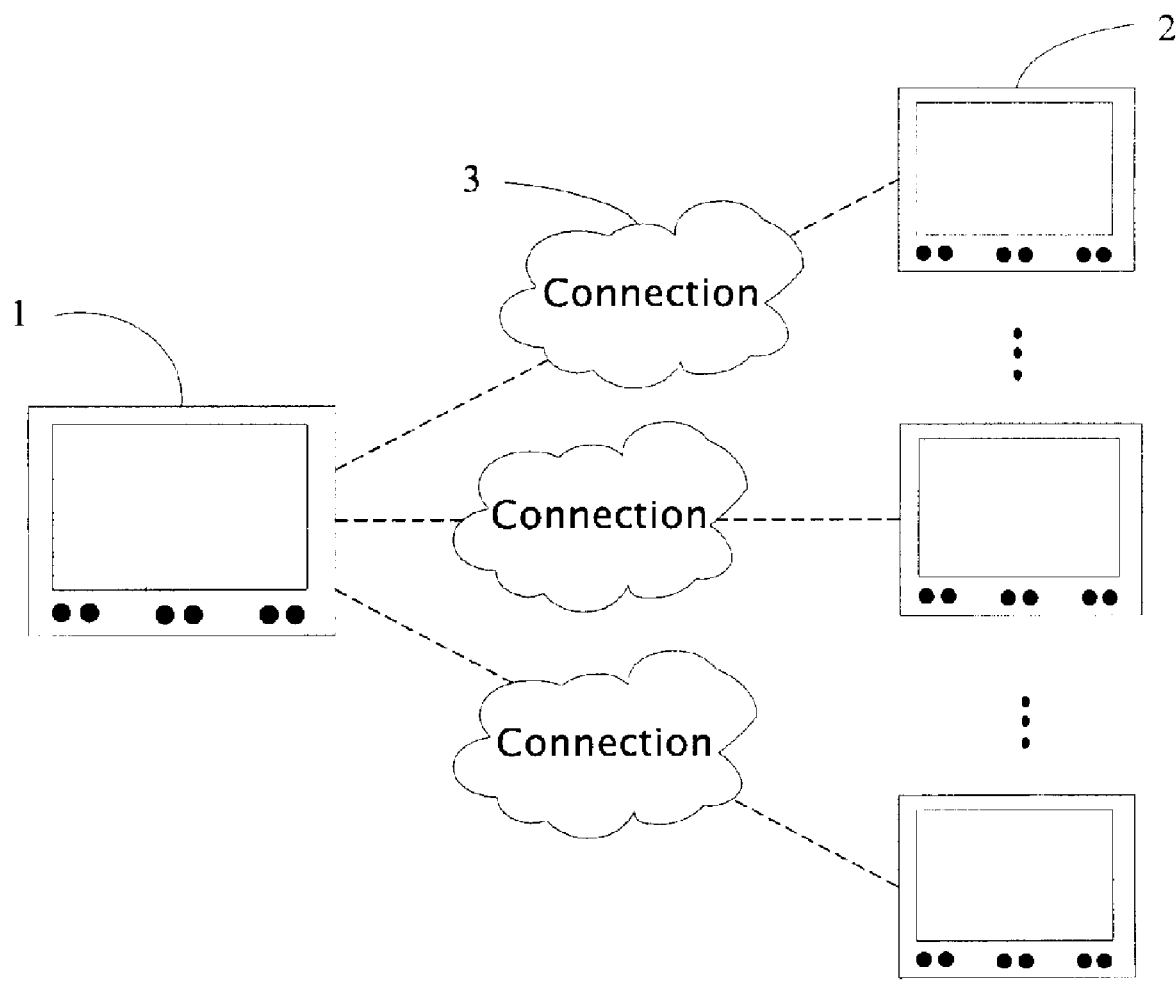
FIG. 1 is a schematic diagram of a system for timely receiving and displaying electronic files in accordance with a preferred embodiment of the present invention.

FIG. 1 is an exemplary hardware infrastructure diagram of a system for timely receiving and displaying electronic files (hereinafter "the system") of a preferred embodiment of the present invention. The system includes an electronic sending device 1, at least one electronic device 2, and a connection 3. The electronic sending device 1 is for compressing an electronic file into a compressed electronic file, and sending the compressed electronic file to the electronic device 2. The electronic device 2 is for receiving the compressed electronic file transmitted from the electronic sending device 1 via the connection 3, decompressing the electronic file, and displaying the compressed electronic file to recipients. The connection 3 can be a wired connection or a wireless connection.

Figure 2:
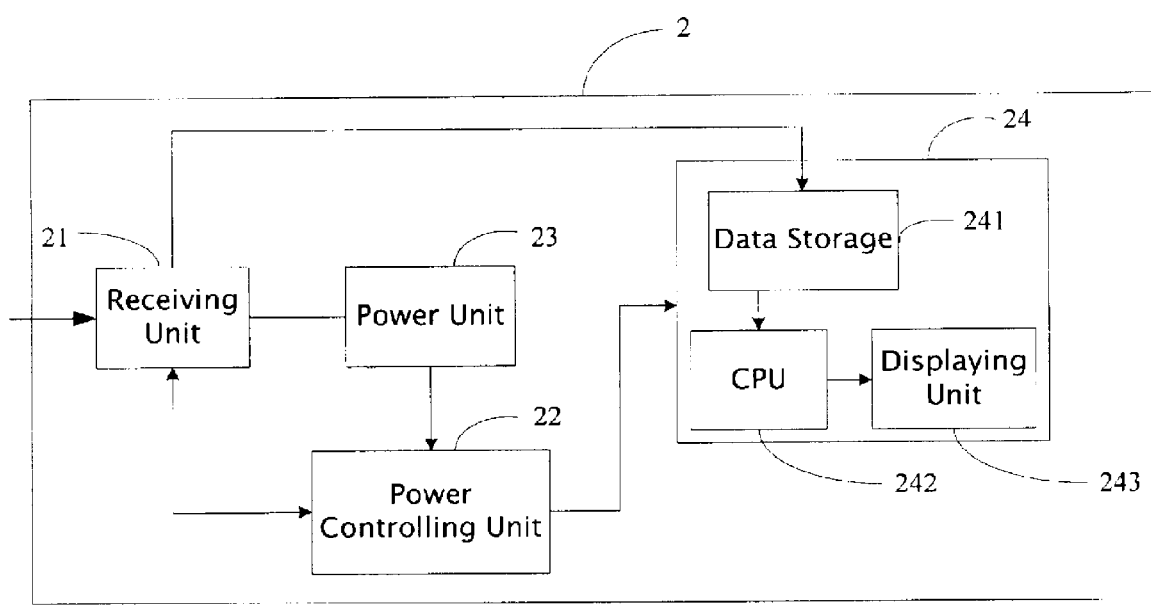
FIG. 2 is a block diagram of a electronic device 2 of the system of FIG. 1.

FIG. 2 is a block diagram of the electronic device 2. The electronic device 2 includes a receiving unit 21, a power controlling unit 22, a power unit 23, and a main part 24.

The receiving unit 21 is for receiving the compressed electronic file transferred from the electronic sending device 1. The power unit 23 is for supplying power to the receiving unit 21, the power controlling unit 22, and the main part 24.

The power controlling unit 22 is interposed between the power unit 23 and the main part 24, and is used for controlling a power supply of the main part 24 in accordance with power controlling signals from the main part 24 or switching units (not shown) operated manually, thus controlling the main part 24 to be in a "power-on" state or a "power-off" state. In the preferred embodiment, the power controlling unit 22 further receives power controlling signals from the receiving unit 21. The power controlling unit 22 provides power supply to the main part 24 according to the power controlling signals from the receiving unit 21, thereby enabling the main part 24 when the main part 24 is in the "power-off" state. The receiving unit 21 directly receive power from the power unit 24 without interruption, thus to receive and store compressed electronic files from the electronic sending device 21 in a timely order.

The electronic sending device 1 compresses an electronic file into a compressed electronic file and sends a want-to-send signal to the electronic device 2. The want-to-send signal informs the electronic device 2 that the compressed electronic file is sent to the electronic device 2. The receiving unit 21 receives the want-to-send signal, and determines from the power controlling unit 22 whether the main part 24 is in the "power-on" state or in the "power-off" state. If the main part 24 is in the "power-on" state, the receiving unit 21 transmits a ready-to-receive signal to the electronic sending device 1 signaling the electronic sending device 1 to send the compressed electronic file.

If the main part 24 is in the "power-off" state, the receiving unit 21 sends a power controlling signal to the power controlling unit 22. The power controlling unit 22 provides power supply to the main part 24 according to the power controlling signal, and the main part 24 is therefore in the "power-on" state. The receiving unit 21 then transmits a ready-to-receive signaling the electronic sending device 1 to send the compressed electronic file.

The receiving unit 21 receives and transmits the compressed electronic file directly to a data storage 241 of the main part 24. A central processing unit (CPU) 242 of the main part 24 fetches the compressed electronic file from the data storage 241, decompresses the compressed electronic file, and displays the electronic file on a display unit 243 of the main part 24.

Figure 3:
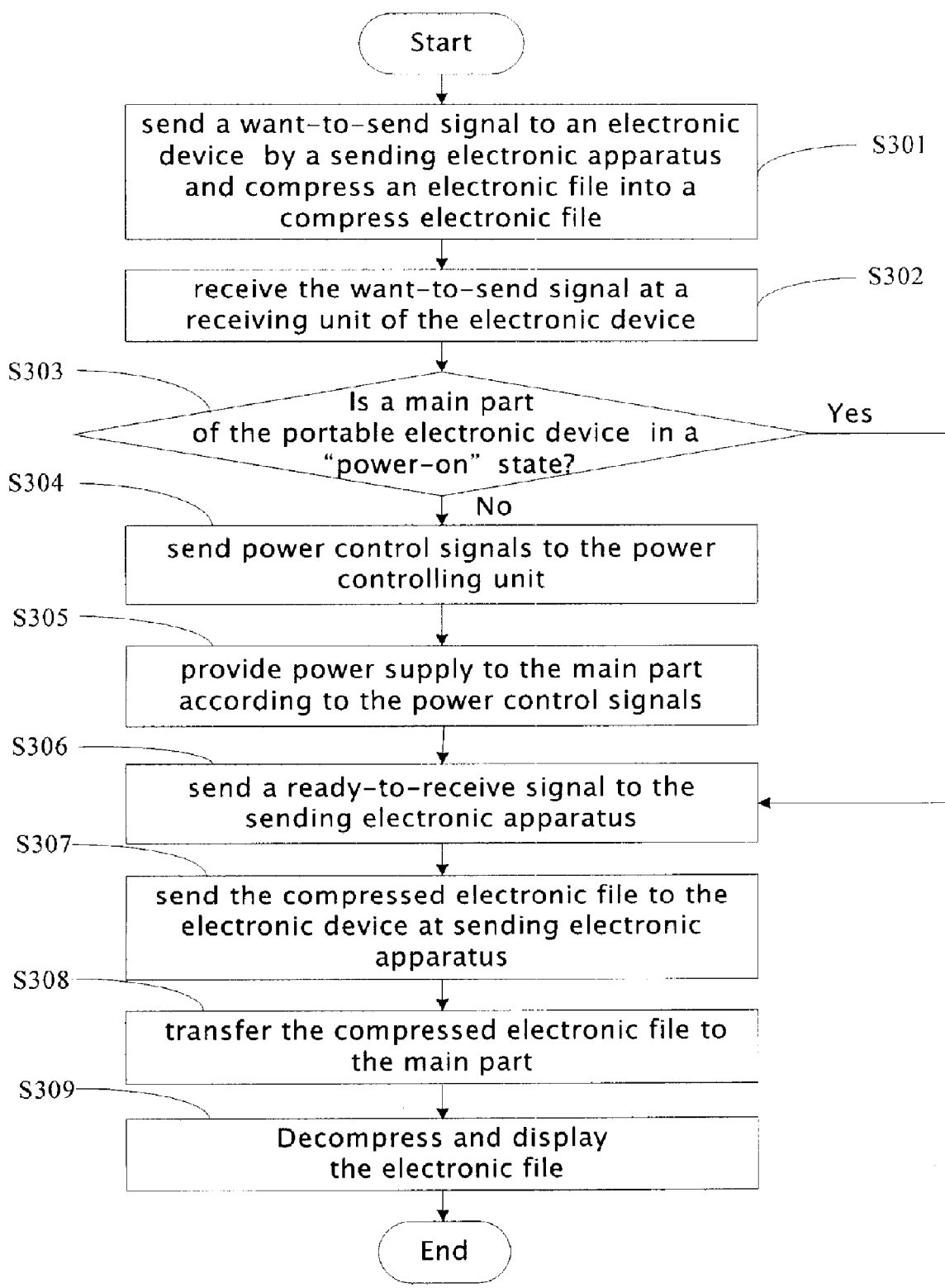
FIG. 3 is a flow chart of a preferred method for timely receiving and displaying an electronic file on the electronic device of FIG. 2.

FIG. 3 is a flow chart of a preferred method for timely receiving and displaying an electronic file on the electronic device 2. In step S301, the electronic sending device 1 compresses the electronic file and sends a want-to-send signal to the electronic device 2.

In step S302, the receiving unit 21 receives the want-to-send signal. In step S303, the receiving unit 21 determines from the power controlling unit 22 whether the main part 24 is in the "power-on" state or in the "power-off" state. If the main part 24 is in the "power-on" state, the procedure goes directly to step S306 described below.

If the main part 24 is in the "power-on" state, in step S304, the receiving unit 21 sends a power controlling signal to the power controlling unit 22. In step S305, the power controlling unit 22 provides power supply to the main part 24 according to the power controlling signal, and the main part 24 is therefore in the "power-on" state.

In step S306, the receiving unit 21 sends a ready-to-receive signal to the electronic sending device 1. In step S307, the electronic sending device 1 sends the compressed electronic file to the electronic device 2 upon receiving the ready-to-receive signal. In step S308, the receiving unit 21 receives and transmits the compressed electronic file directly to the data storage of the main part 24.

In step S309, the central processing unit (CPU) 242 of the main part 24 fetches the compressed electronic file from the data storage 241, decompresses the compressed electronic file, and displays the electronic file on the display unit 243 of the main part 24.

Although the present invention has been specifically described on the basis of a preferred embodiment, the invention is not to be construed as being limited thereto. Various changes or modifications may be made to the embodiment without departing from the scope and spirit of the invention.

What is claimed is:

1. A system for receiving and displaying electronic files, comprising:

an electronic device; and an electronic sending device sending an electronic file and sending a want-to-send signal before the electronic file is sent, the want-to-send signal being predetermined for informing the electronic device of receiving the electronic file;

the electronic device being electrically coupled to the electronic sending device and configured for receiving and displaying the electronic file, the electronic device comprising:

a power unit for supplying power;

a main part for displaying the electronic file, the main part being in one of a "power-on" state and a "power-off" state;

a power controlling unit being interposed between the power unit and the main part, and configured for knowing the main part is in the "power-on" state or in the "power-off" state, and capable of controlling power to supply to or not supply to the main part; and a receiving unit configured for receiving the want-to-send signal and performing the following tasks upon receiving the want-to-send signal:

determining the main part is in the "power-on" state or in the "power-off" state via the power controlling unit;

sending a power controlling signal to the power controlling unit and commanding the power controlling unit to provide power to the main part if the main part is in the "power-off" state;

sending a ready-to-receive signal to inform the electronic sending device to send the electronic file;

receiving the electronic file from the electronic sending device; and transmitting the electronic file to the main part to immediately be decompressed and displayed.

2. The system as described in claim 1, wherein the receive unit receive power from the power unit without interruption.

3. The system as claimed in claim 1, wherein the receiving unit performs the following tasks if the main part is in the "power-on" state:
- sending a ready-to-receive signal to inform the electronic sending device of sending the electronic file;
- receiving the electronic file from the electronic sending device; and transmitting the electronic file to the main part to display.

4. A method for receiving and displaying electronic files, comprising:
- providing an electronic device being electrically coupled to an electronic sending device, the electronic device comprising a receiving unit and a main part, the main part being in one of a "power-on" state and a "power-off" state;
- receiving a want-to-send signal from the electronic sending device with the receiving unit, the want-to-send signal being predetermined for informing the electronic device of receiving the electronic file;
- determining the main part is in the "power-on" state or in the "power-off" state via the power controlling unit;
- providing power supply to the main part under control of the receiving unit if the main part is in the "power-off" state;
- sending a ready-to-receive signal to inform the electronic sending device of sending an electronic file;
- receiving the electronic file from the electronic sending device with the receiving unit;
- decompressing and displaying the electronic file immediately with the main part.

5. The method as described in claim 4, wherein the receiving unit receive power from the power unit without interruption.

6. The method as claimed in claim 4, wherein if the main part is in the "power-on" state, further comprising:
- sending a ready-to-receive signal to inform the electronic sending device of sending the electronic file;
- receiving the electronic file from the electronic sending device; and
- transmitting the electronic file to the main part to display.

7. An electronic device for receiving and displaying electronic files, the electronic device being electrically coupled to an electronic sending device, the electronic sending device configured for sending an electronic file and sending a want-to-send signal before the electronic file is sent, the want-to-send signal being predetermined for informing the electronic device of receiving the electronic file, the electronic device comprising:
- a power unit for supplying power;
- a main part for displaying the electronic file, the main part being in one of a "power-on" state and a "power-off" state;
- a power controlling unit being interposed between the power unit and the main part, and configured for knowing the main part is in the "power-on" state or in the "power-off" state, and capable of controlling power to supply to or not supply to the main part; and
- a receiving unit configured for receiving the want-to-send signal and performing the following tasks upon receiving the want-to-send signal:
- determining the main part is in the "power-on" state or in the "power-off" state via the power controlling unit;
- sending a power controlling signal to the power controlling unit and commanding the power controlling unit to provide power to the main part if the main part is in the "power-off" state;
- sending a ready-to-receive signal to inform the electronic sending device to send the electronic file;
- receiving the electronic file from the electronic sending device; and
- transmitting the electronic file to the main part to immediately be decompressed and displayed.

8. The electronic device as described in claim 7, wherein the receiving unit receives power from the power unit without interruption.

9. The electronic device as claimed in claim 7, wherein the receiving unit performs the following tasks if the main part is in the "power-on" state:
- sending a ready-to-receive signal to inform the electronic sending device of sending the electronic file;
- receiving the electronic file from the electronic sending device; and
- transmitting the electronic file to the main part to display.

* * * * *